Aug. 16, 1949.   L. H. LEONARD   2,479,125
VARIABLE-ATTITUDE HELICOPTER-AIRPLANE
Filed Oct. 6, 1943   5 Sheets-Sheet 1
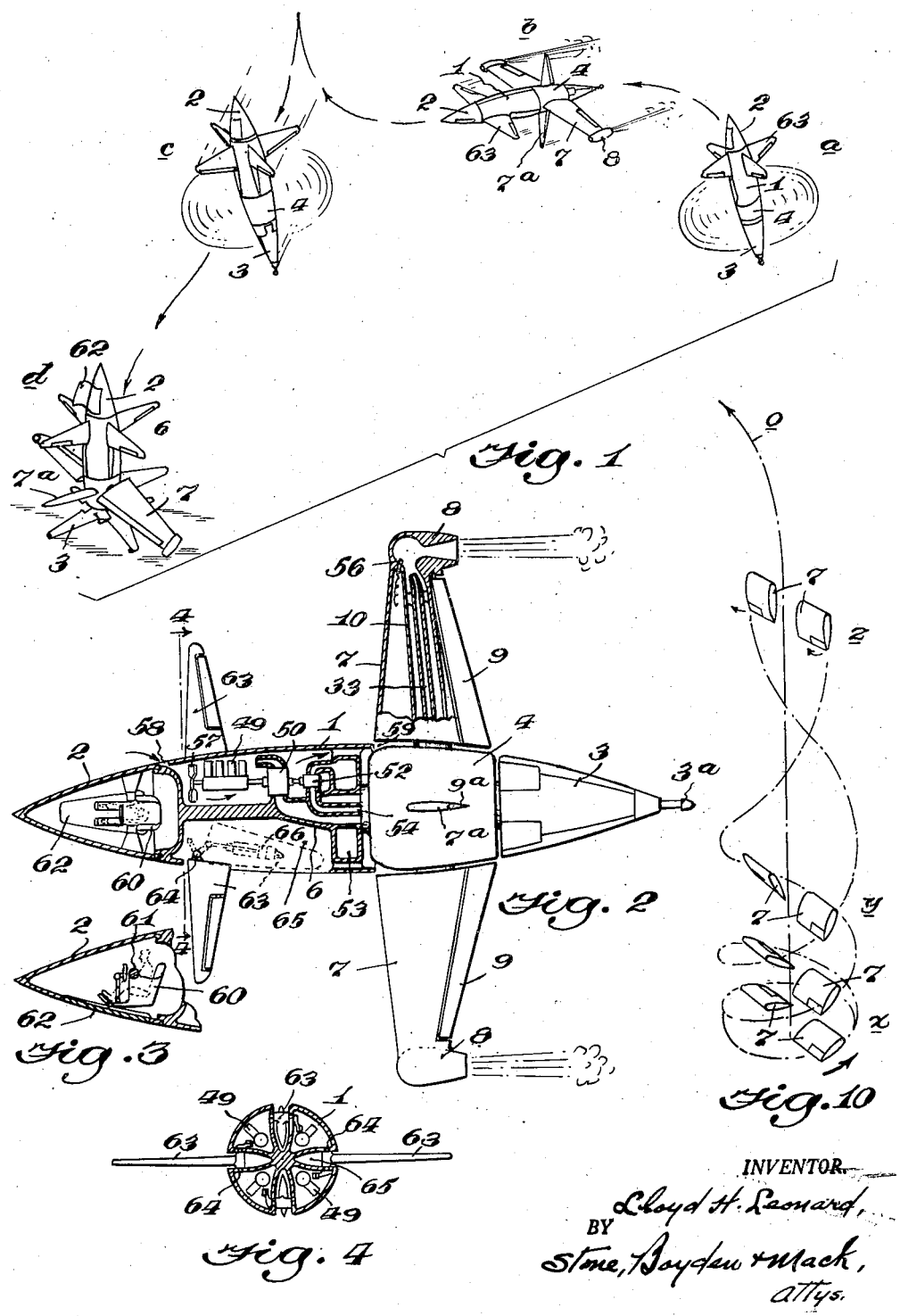
INVENTOR
Lloyd H. Leonard,
BY Stone, Boyden & Mack,
attys.

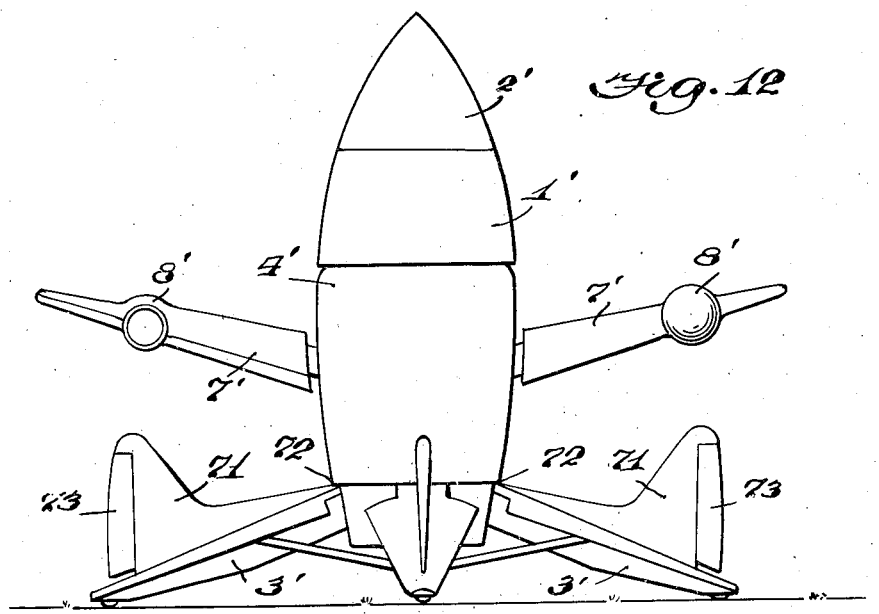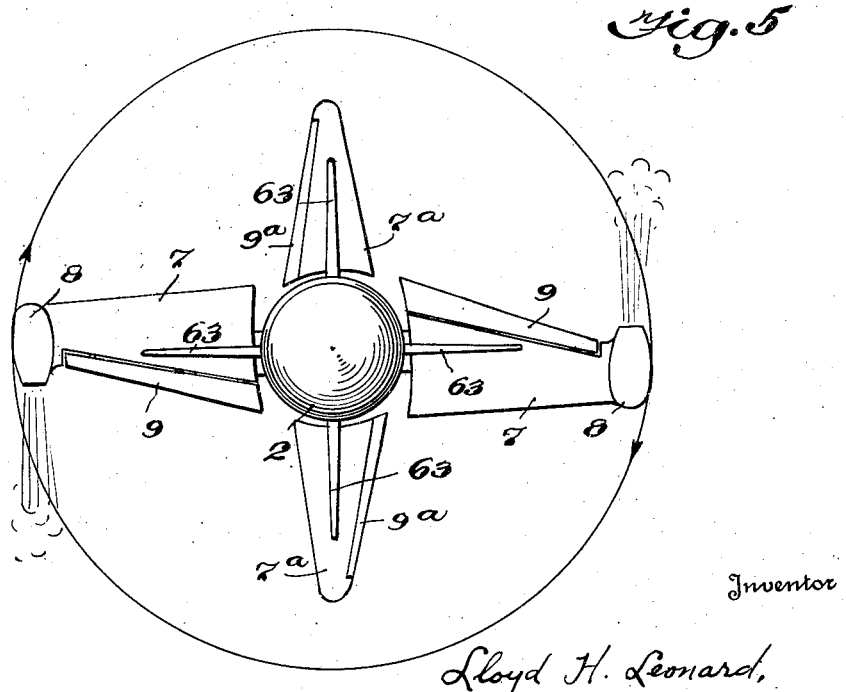

Aug. 16, 1949.  L. H. LEONARD  2,479,125
VARIABLE-ATTITUDE HELICOPTER-AIRPLANE
Filed Oct. 6, 1943  5 Sheets-Sheet 3
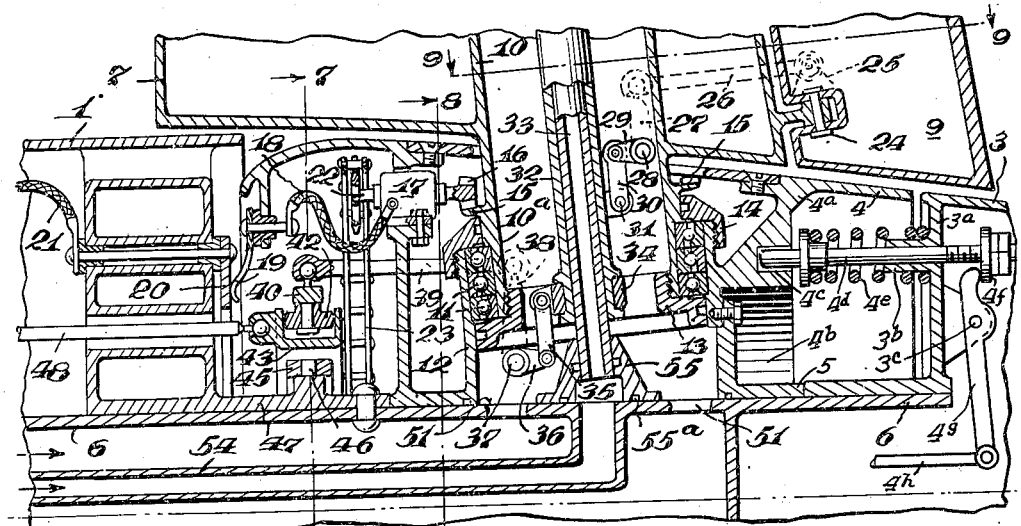
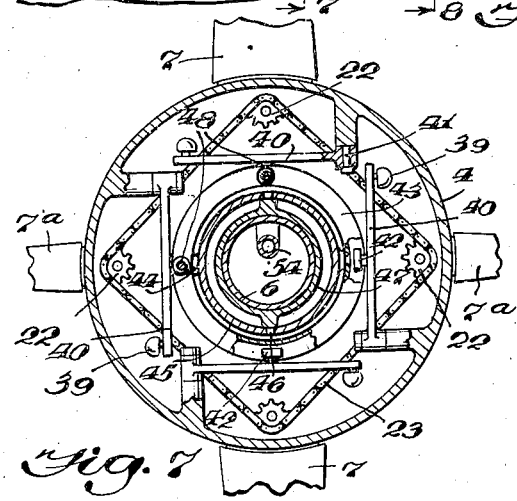
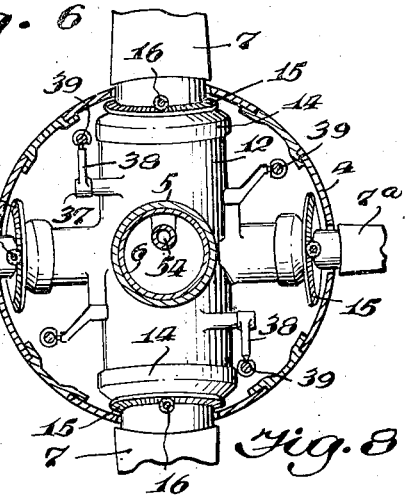
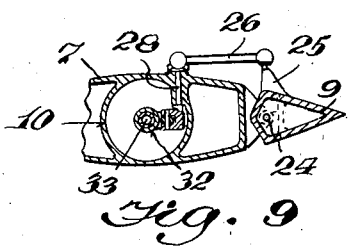
INVENTOR.
Lloyd H. Leonard,
BY Stone, Boyden & Mack,
Attys.

Aug. 16, 1949.  L. H. LEONARD  2,479,125
VARIABLE-ATTITUDE HELICOPTER-AIRPLANE
Filed Oct. 6, 1943  5 Sheets-Sheet 4
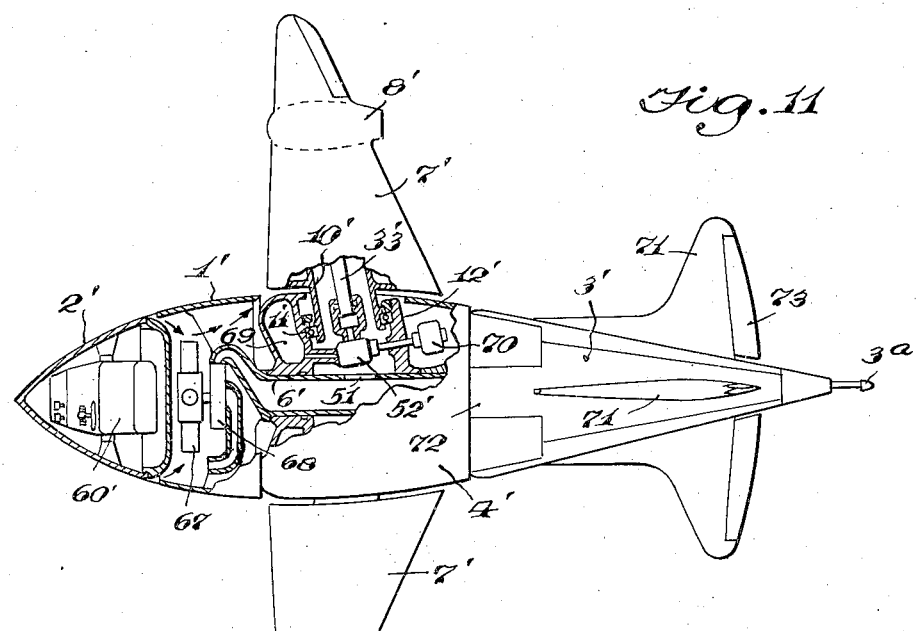
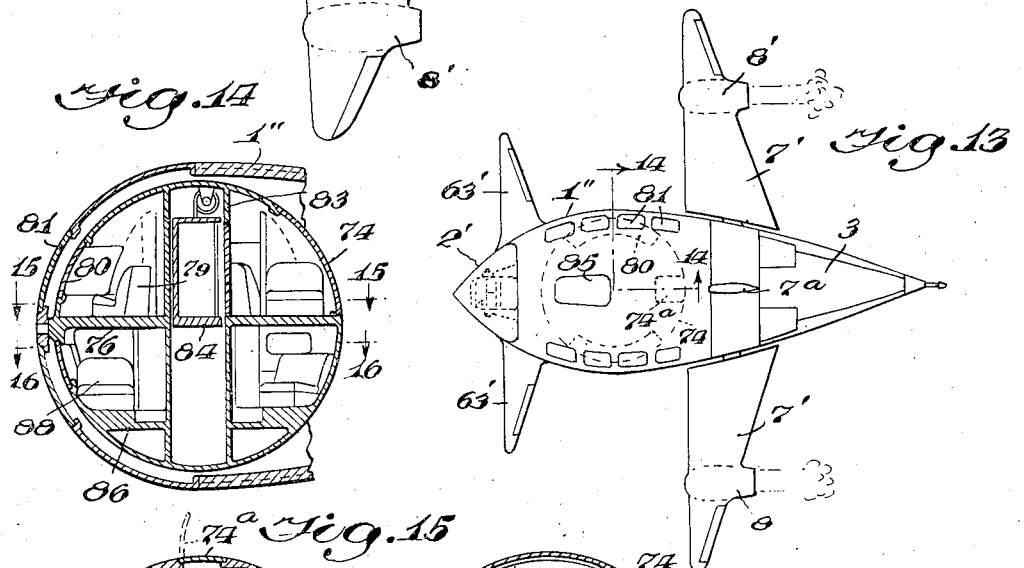
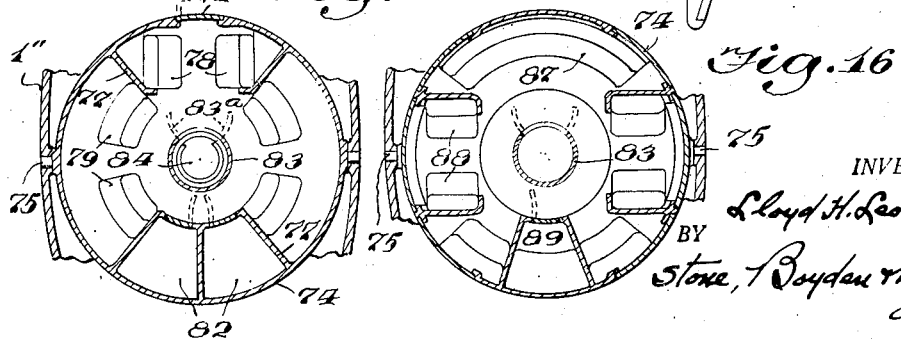
INVENTOR.
Lloyd H. Leonard,
BY
Stone, Boyden & Mack,
attys.

Aug. 16, 1949.　　　L. H. LEONARD　　　2,479,125
VARIABLE-ATTITUDE HELICOPTER-AIRPLANE
Filed Oct. 6, 1943　　　5 Sheets-Sheet 5
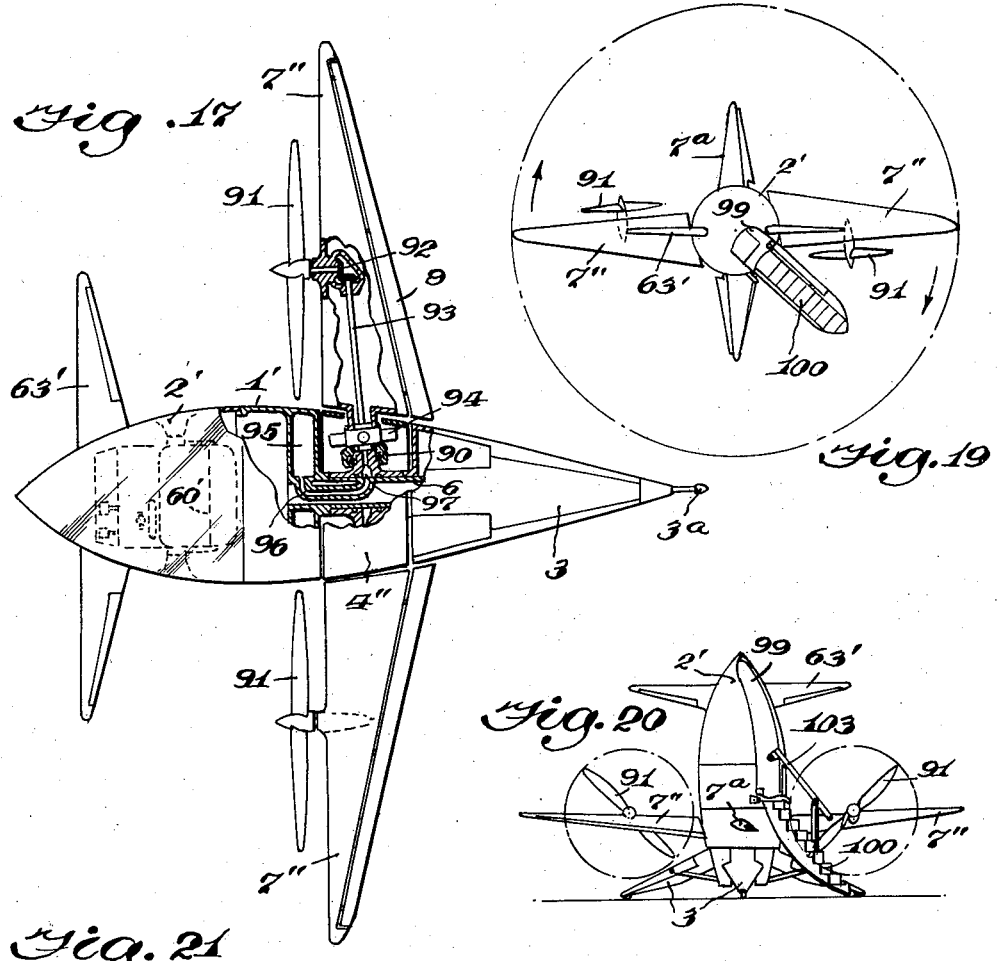
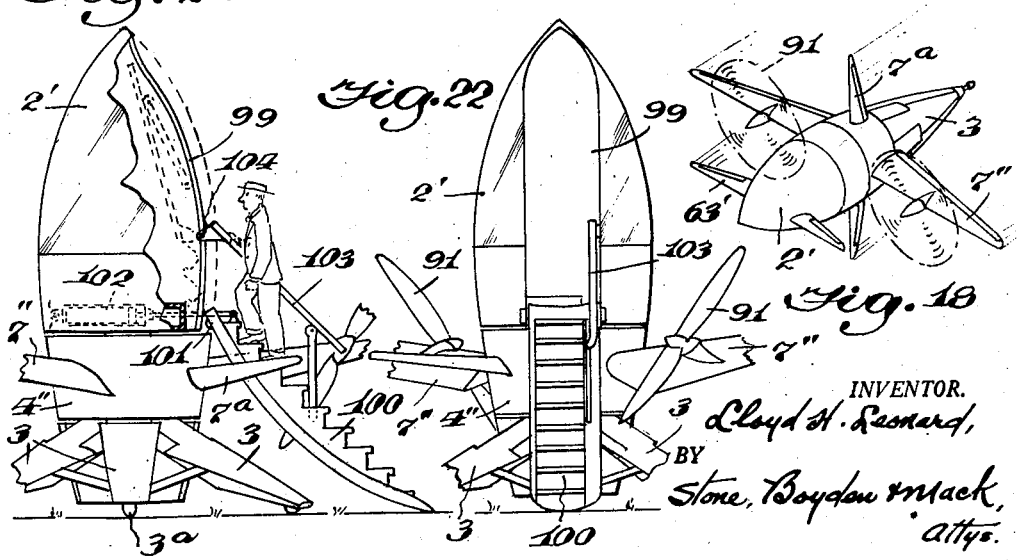

Patented Aug. 16, 1949

2,479,125

UNITED STATES PATENT OFFICE 2,479,125

VARIABLE-ATTITUDE HELICOPTER-AIRPLANE

Lloyd H. Leonard, New York, N. Y.

Application October 6, 1943, Serial No. 505,207

8 Claims. (Cl. 244—7)

This invention relates to aircraft, and more particularly to aircraft of the type capable of both vertical and horizontal flight.

In my prior, co-pending application, Ser. No. 375,991, filed January 25, 1941, which has now matured into Patent No. 2,387,762, issued October 30, 1945, I have shown and described an aircraft of this type in which twin or tandem propellers, rotatable about the longitudinal axis of the fuselage, were employed. While the use of two, co-axial, reversely rotating propellers of this kind has certain advantages, as for example, the elimination of any tortional force on the fuselage, it also has certain disadvantages and necessarily involves mechanical construction which is somewhat complex.

One of the objects of the present invention is to devise an aircraft of this type in which only a single rotor or propeller is employed, thus simplifying the construction, and to provide means for driving this propeller in such a way that, even when mounted to turn about the longitudinal axis of the fuselage, no tortional reaction, tending to rotate the fuselage, will be developed.

Another object of the invention is to devise a new method of propulsion for aircraft, applicable to very high speed ranges. To this end, the invention contemplates the provision of relatively large airfoil surfaces, mounted to rotate in a plane at right angles to the longitudinal axis of the fuselage, combined with means whereby, in climbing, with the axis of the fuselage vertical, such surfaces are rotated to act as propeller blades to supply the desired lift, after the manner of a helicopter, and whereby, after sufficient altitude is reached, and the craft assumes an attitude with its longitudinal axis horizontal, such surfaces cease rotating and remain stationary, thus serving as wings, while, at the same time, a forward thrust is applied to the craft.

A still further object is to provide means, in an arrangement of the type described, whereby the same identical instrumentalities which drive the blades in vertical flight, serve to supply the forward thrust in horizontal flight, while the blades are stationary and act as wings.

Yet another object of the invention is to devise an improved method of operating an aircraft, of the above type, by which the airfoil surfaces or blades are set at very low pitch when taking off, and the pitch is increased progressively as the craft gains speed until the blades reach a full-feathering position, at which position rotation of the blades ceases, and they become wings. A subsidiary object is to provide improved variable pitch mechanism by which the blades may be effectively turned through such a wide angle.

Still further objects of the invention are to provide an improved passenger compartment so mounted within the fuselage that it will remain in substantially the same position, relative to the horizon, regardless of changes in the position of the longitudinal axis of the fuselage; and to provide improved means of access to the passenger compartment of an aircraft of the type in question, when in position for vertical flight.

Yet other objects and advantages will appear from the following description, taken in connection with the accompanying illustrative drawings, forming part of this specification, and in which:

Fig. 1 is a diagrammatic view illustrating the method of flight of my improved aircraft.

Fig. 2 is a plan view of one form of aircraft embodying the invention, parts being in longitudinal section.

Fig. 3 is a fragmentary longitudinal section through the nose of the machine on a plane at right angles to that of Fig. 2.

Fig. 4 is a transverse section, substantially on the line 4—4 of Fig. 2, looking in the direction of the arrows.

Fig. 5 is an end view of the aircraft shown in Fig. 2, as it appears when taking off, parts being omitted for the sake of clearness.

Fig. 6 is a fragmentary longitudinal section on an enlarged scale, showing in detail some of the mechanism employed in the machine illustrated in Fig. 2.

Fig. 7 is a transverse section on a reduced scale, substantially on the line 7—7 of Fig. 6, looking in the direction of the arrows.

Fig. 8 is a transverse section on a similar scale, substantially on the line 8—8 of Fig. 6, looking in the direction of the arrows.

Fig. 9 is a fragmentary section on a reduced scale, substantially on the line 9—9 of Fig. 6, looking in the direction of the arrows.

Fig. 10 is a schematic view illustrating my improved method of varying the pitch of the blades when in vertical flight.

Fig. 11 is a view similar to Fig. 2, but showing a slightly modified construction and arrangement of parts.

Fig. 12 is a side elevation illustrating the machine of Fig. 11 as it appears when supported on its landing gear, ready to take off.

Fig. 13 is a plan view of a craft quite similar to that illustrated in Fig. 11, but showing a novel arrangement of passenger compartment.

Fig. 14 is a sectional view on an enlarged scale, substantially on the line 14—14 of Fig. 13, looking in the direction of the arrows.

Figs. 15 and 16 are horizontal sections substantially on the lines 15—15 and 16—16 of Fig. 14, looking in the direction of the arrows.

Fig. 17 is a view similar to Figs. 2 and 11, but showing a still further modified construction of aircraft embodying the invention.

Fig. 18 is a perspective view on a small scale showing the aircraft of Fig. 17 as it appears when in horizontal flight.

Figs. 19 and 20 are plan and elevational views respectively, showing a machine of the type illustrated in Fig. 17, supported upon its landing gear in a position for taking off.

And Figs. 21 and 22 are side elevations, taken in directions at right angles to each other, showing on a somewhat enlarged scale the aircraft illustrated in Figs. 17 to 20, but with certain parts omitted for the sake of clearness.

Referring to the drawings in detail and more particularly first to Fig. 2, my improved aircraft comprises an elongated fuselage made up of a main or body section 1, a nose section 2, a tail section 3, and a rotor section 4, located between the main body and the tail.

Referring briefly to Fig. 6, the body 1 and tail section 3 are united by a rigid tubular structure 6, on which the rotor 4 is mounted to turn, as by means of extended bearing surfaces 5.

Referring again to Fig. 2, in connection with Fig. 6, it will be seen that projecting radially from the rotor 4 are two main airfoils or blades 7, at the tips of which are mounted propulsion jets 8. Each blade 7 is preferably provided along its trailing edge with an aileron 9, pivoted for angular adjustment with respect thereto, as hereinafter more fully described.

The blades 7 are of the variable pitch type and to this end are rotatably mounted in the rotor. Extending longitudinally through each blade is a tube 10 which, as best shown in Fig. 6, is provided with an extension 10a, projecting into the rotor and constituting supporting means. The inner end of this tubular extension 10a is received in a socket 12 carried by the rotor, suitable ball bearings 11 being preferably interposed between these parts. These ball bearings are confined longitudinally between an inner bushing 13 and an outer cap or retaining ring 14. It will thus be seen that, by virtue of the construction just described, the blades 7 are free to rotate on the trunnions 10a and may be readily adjusted to any desired angle relative to the rotor.

For angularly adjusting these blades for the purpose of varying their pitch, as will be hereinafter more fully described, the following means are provided.

Each trunnion has a ring gear 15 surrounding and rigidly secured to it, and, meshing with this ring gear is a pinion 16, carried by the shaft of an electric motor 17, suitably mounted in the rotor. Current is supplied to the motor 17 from a suitable source through the flexible lead 18, connected at its other end to an insulated brush 19, bearing upon an insulated slip ring 20, which in turn is connected through lead 21 with a suitable control switch. The slip ring 20 is, of course, for the purpose of maintaining the connection while the rotor turns.

To the end of the motor shaft, opposite the pinion 16, is secured a sprocket wheel 22, and passing over this sprocket wheel is a sprocket chain 23.

In addition to the main blades 7, it is preferable to mount on the rotor 4, auxiliary blades or fins 7a, these being located 90° from the main blades. It is also preferable to adjust the pitch of these auxiliary blades or fins at the same time that the pitch of the main blades is adjusted.

Thus, looking at Fig. 7, which is a cross section through the rotor, it will be seen that there are two main blades and two auxiliary blades or fins to be adjusted. Each of these blades or fins is provided with a shank or trunnion, such as 10a, and each of these trunnions carries a ring gear 15 with which a pinion 16 meshes. It would be possible to provide a separate motor 17 for each of the blades, but preferably only a single motor is employed. Four sprocket wheels 22 are, however, needed, each of these sprocket wheels being rigidly connected with its corresponding pinion 16. The sprocket chain 23 passes around all four sprocket wheels 22, as shown in Fig. 7. Thus, when the motor 17 is energized, all of the blades are turned simultaneously and to the same extent.

An aileron 9 is secured to each blade 7 by means of pivots 24, as clearly shown in Figs. 6 and 9, and an aileron 9a is pivoted to each auxiliary blade 7a, and means are provided by which the angular relation between these ailerons and the blades may be adjusted, as desired, independently of the pitch of the blades. This means comprises an arm 25, secured to the aileron 9, connected by a link 26 with an arm 27, secured to a rock shaft 28, journaled in the blade. To the other end of the rock shaft 28, is secured an arm 29 connected by a link 30 and pivot 31, with a sleeve 32 surrounding and mounted to slide upon a tube 33, extending longitudinally of the blade and concentric with the trunnion 10a.

Rotatably mounted in a groove in the inner end of this sleeve 32, is a ring 34, connected by a link 35, with an arm 36 secured to a rock shaft 37. To the other end of this rock shaft, outside of the socket 12, is an arm 38, connected by means of a link 39, with a lever 40, pivoted at 41 to the rotor structure. This lever 40 carries, intermediate its ends, a roller 42, working in a groove in a ring 43, pivotally connected at opposite sides, as indicated at 44, with another ring 45, journaled on trunnions 46 carried by a fixed support 47. Thus, the two rings 43 and 45, pivotally connected at points 90° apart, constitute an universal joint. From the ring 43 extend two control rods 48, located 90° apart, to the pilot's compartment. This universal joint structure and related parts is very similar to that shown and described in more detail in my prior, co-pending application above identified and is for the purpose of providing cyclic pitch control of the ailerons when the blades are rotating.

As already mentioned, I contemplate propelling the aircraft above described by means of jets 8, and the means for supplying air and fuel to these jets will now be explained.

Referring to Fig. 2, 49 designates a gasoline engine or other suitable source of power, and this is coupled to an air compressor 50 and a fuel pump 52. Fuel is delivered by the pump 52 from the fuel tank 53, through a pipe 54 to a port in the tubular structure 6, over which snugly rotates an annular fitting 55, suitable packing 55a being provided to prevent leakage. The tube 33, above mentioned, is set into the fitting 55.

Air is delivered from the compressor 50 through the tubular structure 6 and thence up through openings 51 into the tube 10 (see Fig. 6). Referring to Fig. 2, it will be seen that the fuel pipe 33 extends out through the tube 10, to the jet structure 8. Thus, compressed air and fuel are delivered to the jet and the mixture may be ignited by means of a spark plug 56.

The engine 49 preferably drives a fan 57, which serves to draw air in through an annular opening 58 and force it rearwardly over the engine for cooling purposes, part of this air being directed into the compressor intake, and the remainder escaping through the annular opening 59, between the body 1 and the rotor 4.

The pilot's compartment is in the nose 2 of the craft, a portion, at least, of the walls of this nose compartment being made of transparent material. The pilot sits in a seat 60, hung from pivots 61, in such a manner that it may swing on these pivots so as to maintain the pilot in upright position regardless of changes in the position of the fuselage. Access is had to the pilot's compartment through a door 62, which is shown in Fig. 3 as at the bottom, but which by reference to Fig. 1 will be seen to be capable of opening laterally when the craft is supported in upright position on its landing gear, hereinafter more fully described.

Stabilizing fins 63 are preferably provided, these fins projecting radially from the body of the fuselage at a point adjacent the forward end thereof. Under certain conditions, some or all of these fins may not be necessary, and it is, therefore, desirable to be able to house them within the body of the fuselage, when desired. To this end, each fin 63 is pivotally mounted at its end and a pocket 65 is formed in the body of the fuselage adjacent thereto. When desired, each or all of these fins may be swung on their pivots rearwardly and inwardly into said pockets, so that they are completely housed within the fuselage, as shown in dotted lines in Fig. 2. In Fig. 4, the vertical fins are shown housed within the pockets, while the horizontal fins are extended in operative position, and this arrangement is also illustrated in position b of Fig. 1, showing the craft in horizontal flight. When landing, however, as shown at positions c and d of Fig. 1, it may be desirable to have all four of the fins extended. The fins may be moved to extended or to housed position by means of a power cylinder 66, shown in dotted lines in Fig. 2.

The tail section 3 is made up of a plurality of pivoted tapering segments and is provided with a tripping rod 3a projecting from its rear end, this construction being preferably similar to that shown in detail in my said prior, co-pending application. When the craft descends vertically and the rod 3a engages the ground, the tail segments will be opened up and their rear ends spread apart to constitute legs for supporting the aircraft in an upright attitude, as shown in position d of Fig. 1. This is the take-off position. After the craft has left the ground in flight, the segments of the tail section are again retracted, so as to conform with the body of the fuselage, as shown in Fig. 2.

The novel method of operating my improved aircraft will now be described. When resting on the ground in the attitude shown at position d in Fig. 1, the craft is ready for vertical flight. For this purpose, the blades 7 are set to low pitch, as shown at position d in Fig. 1, and diagrammatically at point x in Fig. 10. The jets 8 lie substantially parallel to the chord lines and discharge in a direction approximately tangential to a circle concentric with the axis of the fuselage, as clearly shown in Fig. 5. When air and fuel is supplied to the jets 8, the operation of these jets serves to drive or rotate the blades 7, thus causing them to exert a lifting force on the aircraft, after the manner of a helicopter. As distinguished from the conventional helicopter, however, the present machine may be aptly described as of the "axial flow" type, since the flow of air past the fuselage is substantially axial during normal horizontal as well as vertical flight. As the craft climbs vertically, as shown at position a in Fig. 1, and gains speed, the pitch of the blades 7 is progressively increased, becoming steeper, as shown at y in Fig. 10, until the blades finally reach full-feathering position, as shown at z. When this position is reached, the rotation of the blades is stopped and they are held stationary in such position in which they lie substantially in a plane parallel with the line of flight, or with the longitudinal axis of the fuselage, as shown in Fig. 2; and at this point the controls are operated in such manner as to bring the craft into position for horizontal flight, as shown at b in Fig. 1. From an inspection of Figs. 1 and 2, it will thus be seen that when this position is reached, the jets discharge in a direction substantially parallel with the line of flight and act to exert a direct forward thrust, which serves to propel the craft.

The blades 7 may be stopped and held stationary, as above described, in any suitable way. One means by which this may be accomplished is shown conventionally in Fig. 6. The inclined inner wall 4a of the rotor 4 is formed with an inwardly projecting annular flange 4b, having a vertical rear face in which two sockets 4c, 180° part, are provided. A locking bolt 4d, slidably mounted in a boss 3b, carried by the transverse wall 3a of the stationary tail section 3, has its forward end rounded and shaped to fit within the sockets 4c. The bolt is urged forwardly to locking position by means of a compression spring 4e, interposed between a collar or shoulder on the bolt and the wall 3a. The bolt carries at its rear end a washer or collar 4f, which is engaged by the outer end of a lever 4g, pivoted at 3c on the tail section. To the inner end of this lever is secured an operating rod 4h, of the pull-push type, extending forwardly to the pilot's compartment. During vertical flight, when the rotor 4 is revolving, the operator, by pulling on the rod 4h, retracts the bolt, and maintains it out of contact with the flange 4b. When, however, the craft is shifted to a horizontal flight attitude, and it is desired to stop rotation of the blades, the operator releases, or pushes the rod 4h, whereupon the forward end of the bolt rides upon the surface of the flange 4b until it is projected into and enters one of the holes or sockets 4c, thus locking the rotor 4 against further movement. It will, of course, be understood that the sockets 4c are so placed that when they are engaged by the bolt 4d, the blades or wings 7 are in the proper position for horizontal flight, as illustrated in Fig. 2.

When it is desired to descend, the pitch of the blades is again decreased and rotation started, while at the same time, the aircraft is shifted toward a vertical position. It then gradually comes down, the speed of descent being regulated by the rotation of the blades.

It will thus be seen that in my improved design, I have provided an aircraft equipped with airfoils, which at times rotate in a plane transverse to the longitudinal axis of the craft and serve as propeller blades, and at other times, are held stationary in a position projecting radially from the fuselage, and thus serve as wings to support the craft. It will further be noted that by driving the blades by means of tangentially directed jets, there is no torque reaction tending to turn the fuselage, and also that these same jets which serve to drive the blades when they are rotating, also serve to directly propel the craft, when the blades are stationary and acting as wings.

In Fig. 11, I have shown a slightly modified construction of aircraft of the same general type as that illustrated in Fig. 2. In this modified construction the jets 8' are disposed inwardly from the ends of the blades 7'. Such an arrangement may have certain advantages. The pilot's seat 60' is shown as pivotally mounted in the nose section 2', as before. In the body 1' of the fuselage is mounted an engine 67 driving an air compressor 68. This delivers air through the tubular structure 6' and through the opening 51 into the tube 10', extending through each blade and journaled at 11' in sockets 12', as before. Fuel is fed from the tank 69 by means of a fuel pump 52', driven by an electric motor 70 and is delivered into the pipe 33', extending through the tube 10' to the jet. This arrangement differs from that shown in Fig. 2 principally in that the fuel tank and fuel pump are mounted in the rotor 4' itself, rather than in the stationary body of the fuselage.

Also, in the modification of Fig. 11, the tail structure is somewhat different. As shown, the tail is made up of tapering segments 3', as before, pivoted at 72. However, in Fig. 11, each of these segments carries a tail surface or fin 71, provided as usual with an aileron 73. When this tail structure is opened up to constitute landing gear, it will have somewhat the appearance shown in Fig. 12, which illustrates the craft supported on such landing gear in upright position.

It will, of course, be understood that while, in order to simplify the drawing, no means for varying the pitch of the blades is illustrated in Fig. 11, I contemplate the use of pitch varying means, such as shown in Figs. 6 to 8. It will also be understood that this design of Fig. 11 is intended to operate in the same manner as described in detail in connection with Figs. 1, 2 and 10.

Referring now to Figs. 13 to 16, inclusive, I have illustrated a still further modified construction of aircraft. In this form, blades 7' and jets 8', similar to those of Fig. 11, are employed, and I also preferably use forward stabilizing fins 63', similar to the fins 63 of Fig. 2.

The principal feature of the design of Figs. 13 to 16, however, relates to a novel passenger compartment. As is well known, it is the common practice to supply air to passenger compartments under pressure, especially when flying at high altitudes. It is also well-known that a container of spherical shape is best adapted to withstand the strains due to internal pressure. I, therefore, propose to provide a passenger compartment of spherical form. This spherical passenger compartment is designated in its entirety by the reference character 74 and is mounted within the body 1" of the fuselage on trunnions 75 so disposed that the spherical compartment is free to swing on these trunnions in a plane parallel with the longitudinal axis of the fuselage. It is either mounted somewhat eccentrically on its trunnions or the weight is so distributed that it tends to maintain a definite position relative to the horizontal, regardless of variations in the position of the fuselage itself.

Referring to Fig. 14, I preferably divide the spherical structure by a partition 76 into upper and lower chambers, this partition constituting the floor of the upper chamber or section and the ceiling of the lower one. By reference to Figs. 15 and 16, it will be further seen that each of these chambers is preferably divided by partitions 77, into rooms or segments, in which seats or other furniture are placed. The drawings show a typical arrangement in which there are pairs of seats 78 facing each other in one of the rooms of the upper floor, and other pairs of seats 79, placed in other rooms, facing outwardly. The occupants of these seats 79 can look out through windows 80 in the passenger compartment 78, which register with windows 81 formed in the body of the fuselage. Other rooms 82 of the upper floor may serve as washrooms.

An elevator shaft 83 is shown as extending centrally through the upper and lower sections of the compartment, and in this shaft operates an elevator 84, for transferring passengers from one floor to the other. The elevator shaft is shown as provided with doors 83ª. The lower space or section of the compartment, is provided with a floor 86. In it may be arranged pairs of seats 88 facing each other, and a long bench or sofa 87. 89 designates the small room which may be used as a kitchen.

Access is preferably afforded to the passenger compartment through a door 74ª, communicating with the upper floor. When the aircraft is supported in vertical position on its landing gear 3, as shown in Fig. 12, or at position d of Fig. 1, the door 74ª will register with a door 85 in the fuselage itself. This door may be reached by means of a ladder or stairway preferably of the type hereinafter described.

In Fig. 17 I have illustrated a still further modified construction of aircraft operating on the same general principle as those already described. This type of craft comprises a body section and a nose and tail section as before, together with a rotor 4" from which project blades 7". These blades have trunnions extending into the rotor and are rotatably mounted upon a bearing stud 90.

Instead of jets, I employ in this modification propellers 91, of the conventional type, one such propeller being mounted at the leading edge of each blade. These propellers may be driven through bevel gearing 92 by means of a shaft 93, extending axially through the main blade 7" and itself driven by means of an engine 94, carried by the trunnion of the blade and rotatable therewith. Fuel may be supplied to this engine from a fuel tank 95 through pipe 96, which delivers into an internal annular groove 97 formed in the hub of the rotor and having a passageway communicating with the engine. Fig. 18 illustrates an aircraft of this character as it appears when in normal horizontal flight, and under such conditions, it does not differ greatly either in appearance or operation from a conventional airplane.

With this modification, as with the preceding forms, it is intended that the craft will be supported in vertical position by its landing gear 3, as shown in Fig. 20, and will take-off vertically from this position. By reference to Fig. 19, it will be particularly noted that when in this position for taking off, the blades 7'', which, of course, are of the variable pitch type such as herein described, are shifted to a very low pitch and are so disposed that the propellers 91 face in opposite directions. Thus, when these propellers 91 are driven, they create a tangential thrust, the same as the jets 8, which serves to rotate the main blades 7''. As these blades rotate, and as the machine rises and gains speed, the pitch is progressively increased, as shown in Fig. 10, until the maximum pitch or full-feathering position is reached. At this point, the rotation of the main blades is stopped and the aircraft is shifted over into horizontal flying position, whereupon the propellers 91 apply a forward thrust directly to the craft, as in the conventional airplane.

In this modification also, as in the previous forms, in which jets are employed, it will be seen that identically the same means which drives the main blades and causes them to rotate for supplying the necessary lift for vertical climbing, serves to directly propel the craft in horizontal flight, after the desired altitude has been reached.

In Figs. 21 and 22, I have illustrated a craft of the general type shown in Fig. 17. In these figures, I have shown the fuselage as having a doorway 99 at one side thereof. Access to this doorway is afforded by means of a ladder or stairway 100 pivoted at its upper end to the fuselage at 101, at the bottom of the doorway. This stairway is adapted to be folded upwardly about its pivot 101 into the opening 99, so that it constitutes a door for closing such opening. A power cylinder 102 may be employed for moving the stairway. A hand rail 103 may also be provided, and may be pivoted to the edge of the doorway at 104, so that it will fold into the interior of the fuselage, as shown in dotted lines in Fig. 21, when the stairway is swung upwardly so as to close the opening. It will be noted that the stairway is pivoted to the fuselage at a point just above the rotor 4'' and thus serves to span the distance from the ground to the upper edge of this rotor. In Figs. 21 and 22, the stabilizing fins 63' are omitted for the sake of clearness. This stairway arrangement, while illustrated in connection with the type of craft shown in Fig. 17, is, of course, equally applicable to those shown in the other figures, particularly Fig. 13.

What I claim is:

1. In an aircraft, an elongated fuselage, blades mounted for rotation about the longitudinal axis thereof, and means whereby said blades may be caused to rotate to provide a propelling force, or may be held stationary to serve as supporting wings.

2. In an aircraft capable of both vertical and horizontal flight, an elongated fuselage, blades mounted on said fuselage at a point intermediate its ends for rotation about the longitudinal axis thereof, and means whereby said blades are caused to rotate to provide a lifting force for climbing in vertical flight, and are maintained stationary to serve as supporting wings for the craft in horizontal flight.

3. In an aircraft capable of both vertical and horizontal flight, an elongated fuselage, blades mounted on said fuselage for rotation about the longitudinal axis thereof, means on said blades for causing them to rotate to lift the aircraft endwise in vertical flight, means for maintaining said blades stationary to serve as supporting wings during horizontal flight, and means whereby said first mentioned means serves to propel the aircraft when said blades are stationary.

4. In an aircraft having rotatably mounted variable pitch propelling blades adjustable from a minimum angle to the plane of rotation to a position at right angles to such plane, means carried by said blades for driving the same, said means being so constructed and so mounted on the blades that said blades are caused to rotate when adjusted to relatively small pitch, but the force tending to rotate them approaches zero when the pitch approaches the maximum, and means for locking said blades against rotation when adjusted to a position at right angles to the plane of rotation.

5. In an aircraft having variable pitch propelling blades mounted to rotate about an axis substantially parallel with the line of flight, means carried by said blades for driving the same to cause them to rotate, said means being arranged to exert a force on each of said blades substantially tangential to a circle concentric with its said axis of rotation when adjusted to small pitch, but to exert substantially no such force when said blades are adjusted to maximum pitch in which they occupy a position at substantial right angles to the plane of rotation, and means for holding the blades stationary in such position to serve as supporting wings.

6. An aircraft having an elongated fuselage, a single rotor only mounted intermediate the ends of said fuselage to turn about the longitudinal axis thereof, blades projecting radially from said rotor, a propeller mounted on each blade adjacent the leading edge thereof, means for driving said propellers, and means for varying the pitch of said blades in such manner that the plane of rotation of said propellers can be shifted from a position in which said plane lies substantially parallel with said longitudinal axis through successive angular positions to a position in which it lies at substantial right angles thereto.

7. An aircraft comprising an elongated fuselage, a rotor mounted to turn about the longitudinal axis of said fuselage and located at a point intermediate the ends thereof, variable pitch airfoils projecting radially from opposite sides of said rotor, means whereby, when said airfoils are adjusted to a position at an acute angle to the plane of rotation, they are caused to rotate to serve as propeller blades, and means whereby, when said airfoils are adjusted to a position at substantial right angles to the plane of rotation they are held stationary, and constitute wings for supporting the craft.

8. An aircraft comprising an elongated fuselage, a rotor mounted to turn about the longitudinal axis of said fuselage and located at a point intermediate the ends thereof, variable pitch airfoils projecting radially from said rotor, driving means carried by each of said airfoils, means whereby when said airfoils are adjusted to a position at an acute angle to the plane of rotation, said driving means causes them to rotate to serve as propeller blades, and means whereby, when said airfoils are adjusted to a position at substantial right angles to the plane of rotation, they are caused to remain stationary and serve as wings for supporting the craft, and said driving means are caused to exert a direct forward thrust to propel the craft.

LLOYD H. LEONARD.

(References on following page)

REFERENCES CITED

The following references are of record in the file of this patent:

UNITED STATES PATENTS

| Number | Name | Date |
|---|---|---|
| 1,133,660 | Papin | Mar. 30, 1915 |
| 1,247,412 | Lake | Nov. 20, 1917 |
| 1,262,660 | Gallaudet | Apr. 16, 1918 |
| 1,288,336 | Whittemore | Dec. 17, 1918 |
| 1,398,750 | Stewart | Nov. 29, 1921 |
| 1,449,129 | Pescara | Mar. 20, 1923 |
| 1,454,944 | Pescara | May 15, 1923 |
| 1,526,230 | Pescara | Feb. 10, 1925 |
| 1,622,191 | Terry | Mar. 22, 1927 |
| 1,641,700 | Sperry | Sept. 6, 1927 |
| 1,655,114 | Tesla | Jan. 3, 1928 |
| 1,686,080 | Ford | Oct. 2, 1928 |
| 1,754,910 | Serna | Apr. 15, 1930 |
| 1,793,349 | Anderson | Feb. 17, 1931 |
| 1,820,946 | Pitcairn | Sept. 1, 1931 |
| 1,848,321 | Cresci | Mar. 8, 1932 |
| 2,022,476 | Myers | Nov. 26, 1935 |
| 2,043,704 | McPherren | June 9, 1936 |
| 2,142,601 | Bleecker | Jan. 3, 1939 |
| 2,156,252 | Cichero | Apr. 25, 1939 |
| 2,268,009 | Babb et al. | Dec. 30, 1941 |
| 2,328,786 | Crowder | Sept. 7, 1943 |
| 2,397,357 | Kundig | Mar. 26, 1946 |

OTHER REFERENCES

"Astronautics," No. 55, July 1943, page 8.

"Flight," vol. XIII, No. 30, page 803, July 22, 1920.